United States Patent [19]
Masri et al.

[11] Patent Number: 4,841,685
[45] Date of Patent: Jun. 27, 1989

[54] CONTROLLABLE DAMPER

[75] Inventors: Sami F. Masri, Pasadena; Tejav J. Dehghanyar, Redondo Beach; Thomas K. Caughey, Pasadena, all of Calif.

[73] Assignee: University of Southern California, Los Angeles, Calif.

[21] Appl. No.: 120,771

[22] Filed: Nov. 13, 1987

Related U.S. Application Data

[63] Continuation of Ser. No. 766,614, Aug. 16, 1985, abandoned.

[51] Int. Cl.$^4$ .................. F16M 13/00; E04H 9/02
[52] U.S. Cl. ............................. 52/1; 52/167; 244/75 A; 248/638; 267/140.1
[58] Field of Search .......... 267/136, 140.1, 154; 52/167, 1; 188/381, 279; 248/638; 244/75 A

[56] References Cited

U.S. PATENT DOCUMENTS

| | | | |
|---|---|---|---|
| 2,038,603 | 4/1936 | Roche | 244/75 A |
| 2,361,071 | 10/1944 | Vang | 244/75 A |
| 2,519,762 | 8/1950 | Hoffmann | 244/75 A |
| 2,586,043 | 2/1952 | Hodgson | 244/75 A |
| 4,098,034 | 7/1978 | Howell | 52/1 |
| 4,429,496 | 2/1984 | Masri | 52/1 |
| 4,502,652 | 3/1985 | Broitbach | 244/75 A |

OTHER PUBLICATIONS

Dehghanyar et al., "Semi-Active Control of Nonlinear Flexible Structures", presented at XVIth International Congress of Theoretical and Applied Mechanics, 19–25 Aug. 1984, Lyngby, Denmark.

Dehghanyar, T., "Analytical and Experimental Studies of the Active Control of Flexible Structures", pp. 121–137, Doctoral Dissertation presented to the Faculty of the Graduate School of the University of Southern California, 1984.

Masri et al., "On the Stability of the Impact Damper", *Journal of Applied Mechanics*, Paper No. 66-APM-CC (1966).

*Primary Examiner*—John E. Murtagh
*Attorney, Agent, or Firm*—Nilsson, Robbins, Dalgarn, Berliner, Carson & Wurst

[57] ABSTRACT

Stress to a flexible structure in a dynamic environment is suppressed by controlling at least one variable parameter of an associated damper in accordance with sensed information as to movement of the structure. In a preferred embodiment, the damper is an impact damper having an auxiliary mass mounted for movement within a variable clearance permitting the timing of impacts to be controlled. In either case, impacts between the auxiliary mass and the flexible structure occur substantially when the flexible structure passes through a preselected neutral position, at which the velocity of the structure is a maximum.

13 Claims, 11 Drawing Sheets

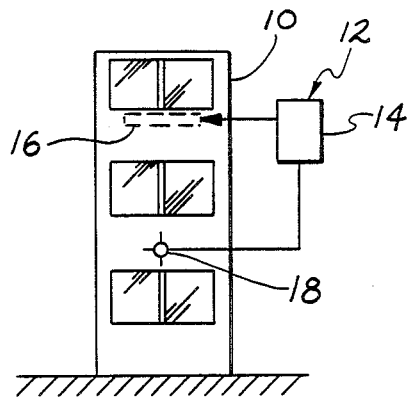
FIG. 1
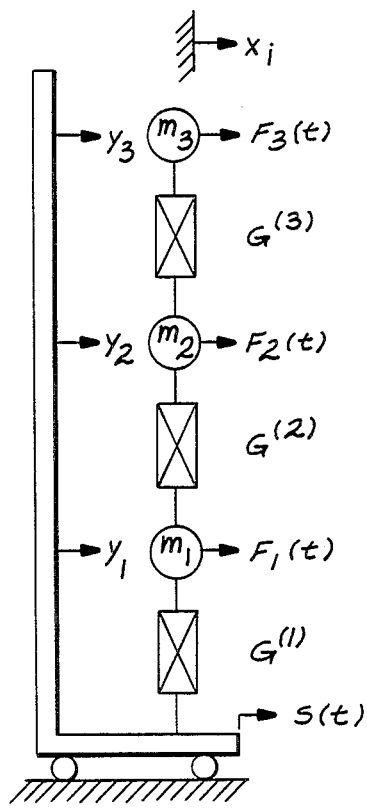
FIG. 2A
| WEIGHT | STIFFNESS | DAMPING |
|---|---|---|
| lb | lb/in. | lb/s/in. |
| 4,600 | | |
| | 149,000 | 60 |
| 4,600 | | |
| | 149,000 | 60 |
| 4,600 | | |
| | 72,140 | 21 |
FIG. 2B

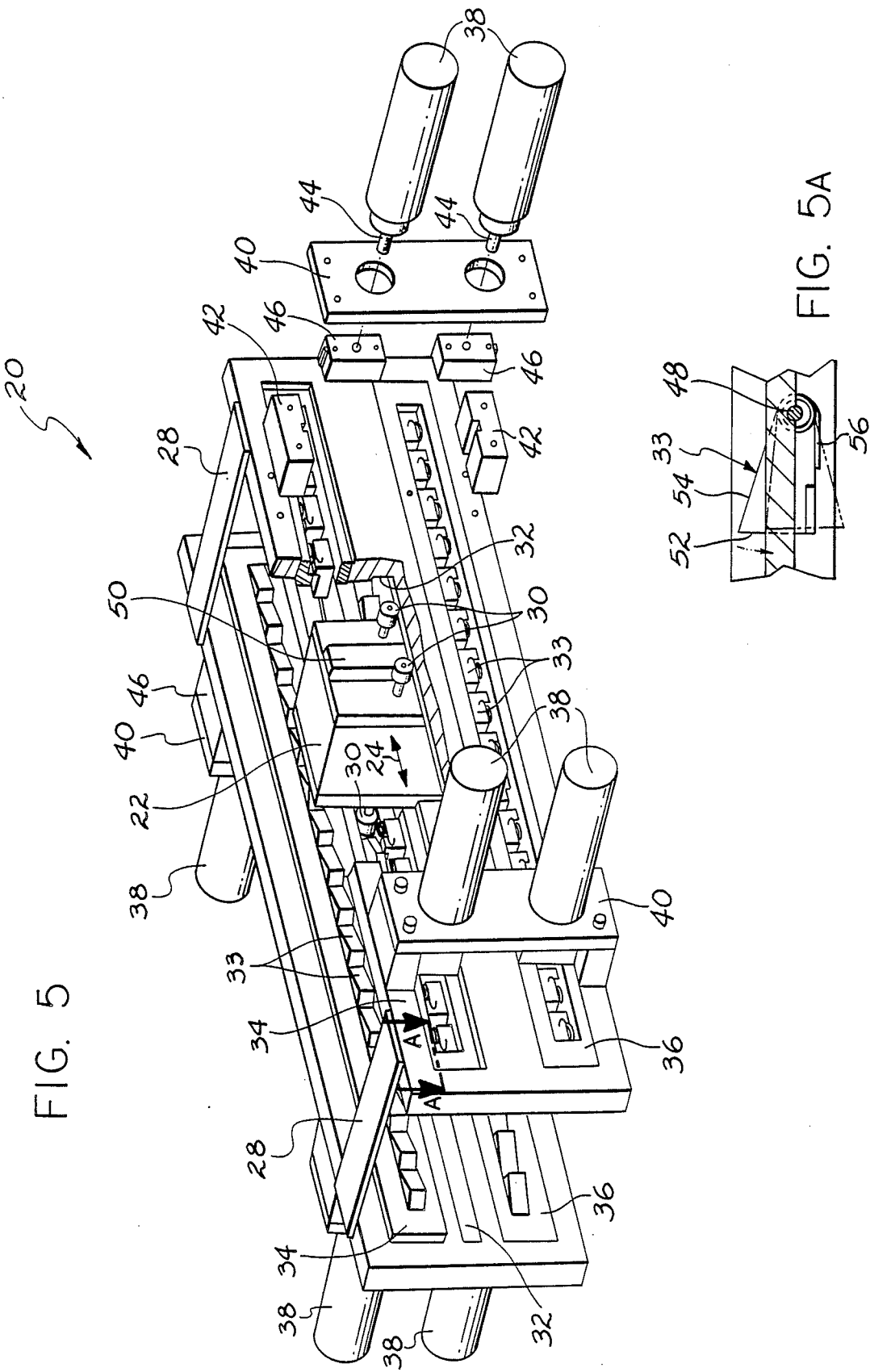

FIG. 9
$F(t) =$ FREE VIBRATION $\quad \omega_1 = 4.0 \quad \zeta_1 = 0.01 \quad \mu = 0.10$
$\zeta_2 = 0.1 \quad \omega_2/\omega_1 = 10$
A)
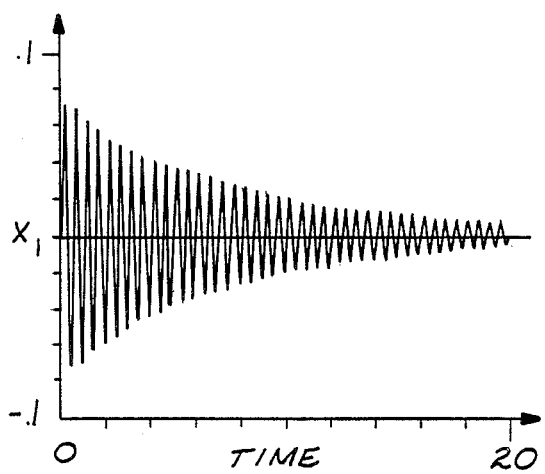
B)
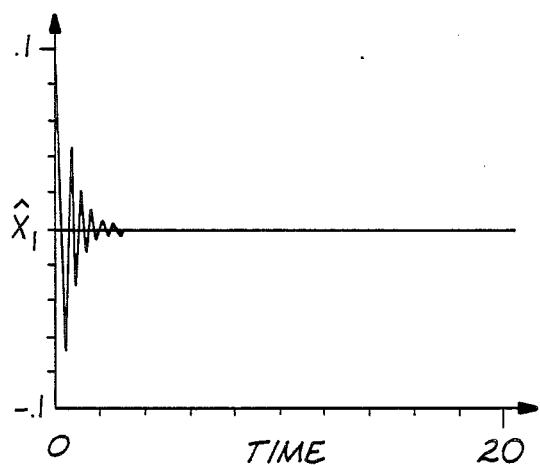
C)
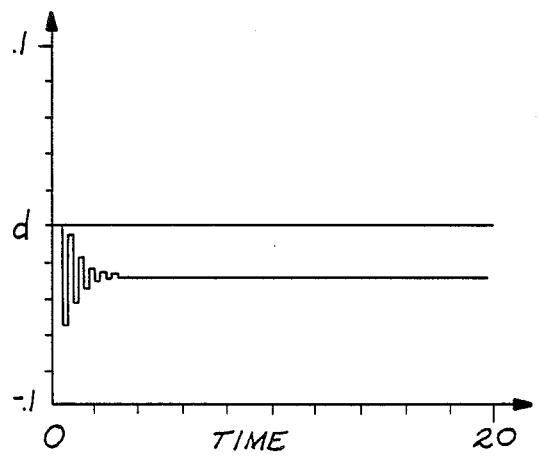

FIG. 11
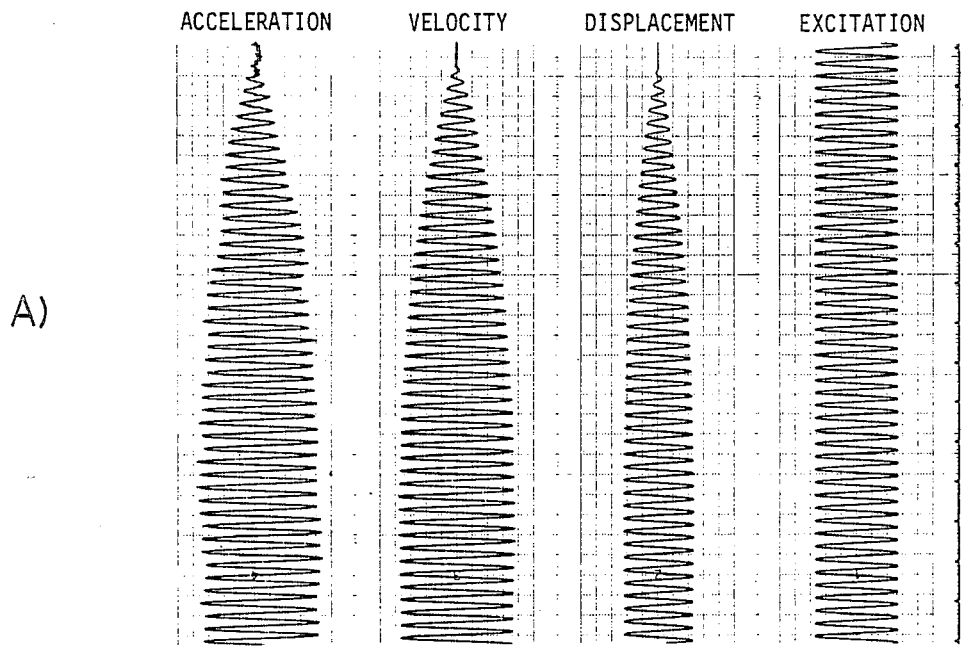
A)
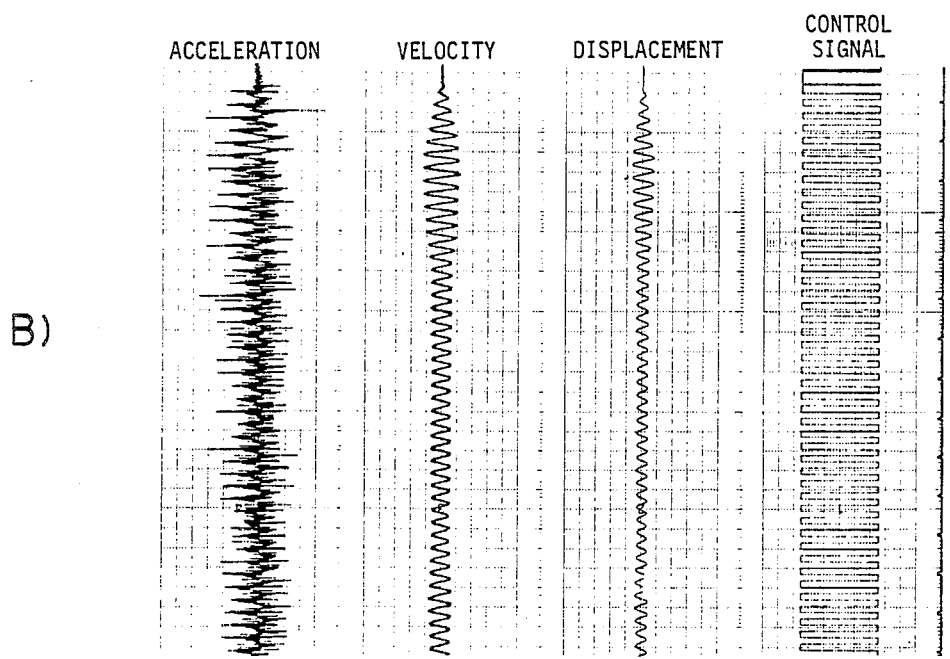
B)

FIG. 13
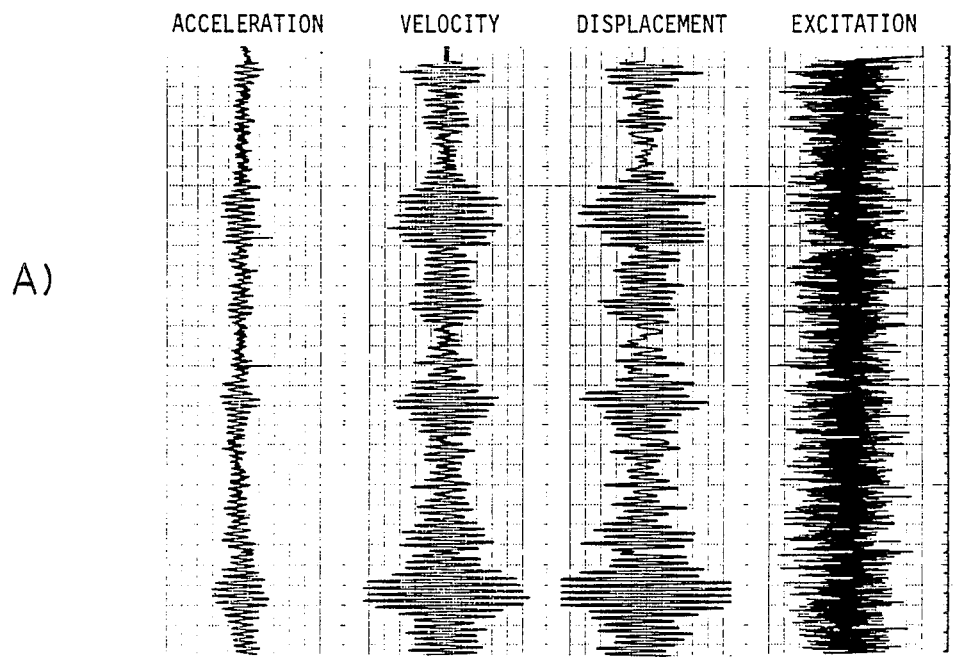
A)
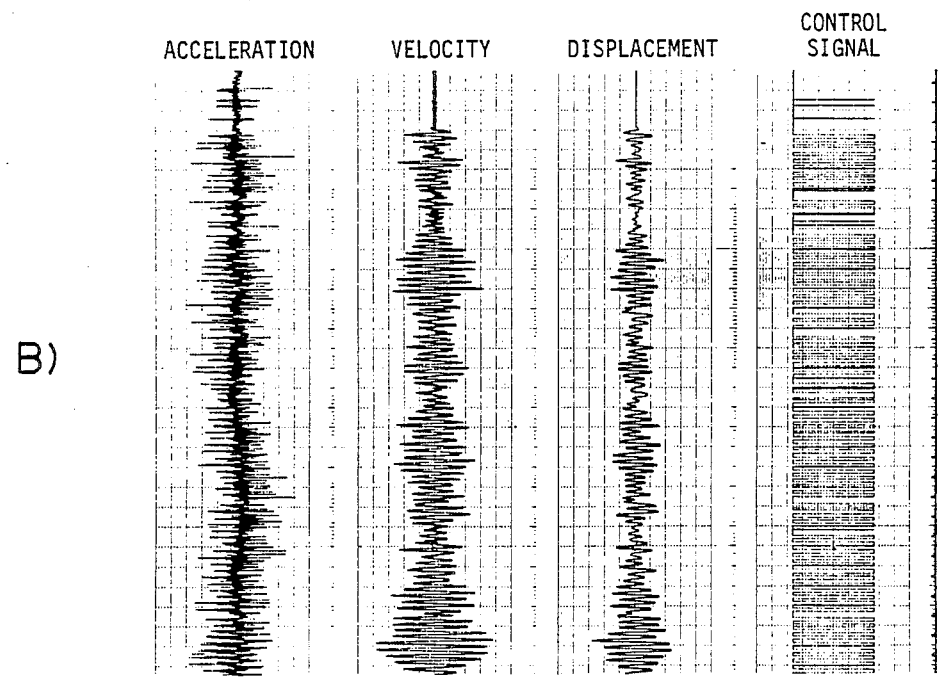
B)

CONTROLLABLE DAMPER

This is a continuation of application Ser. No. 766,614 filed on Aug. 16, 1985, now abandoned.

BACKGROUND OF THE INVENTION

The present invention relates generally to the field of motion damping systems and, more particularly, to an apparatus and method for controllably damping motion of a flexible structure subjected to a dynamic environment.

Passive auxiliary mass dampers, in which the response of a primary oscillating system is attenuated by a relatively small auxiliary mass attached to the primary system by a resilient element, have long been used for linear vibration control. The dynamic vibration neutralizer (DVN), also known as the Frahm damper, is a leading member of this class. It relies on "tuning" the auxiliary mass to generate an opposing force capable of reducing motion of the primary system under steady state conditions. Another common linear device is the Lanchester damper, which relies exclusively on dissipation of mechanical energy by a viscous dashpot.

Nonlinear auxiliary mass dampers have been used in situations involving transient and/or wide-band excitations, in which linear dampers are inefficient. One highly nonlinear device, known as an impact or "acceleration" damper, is described in Paget, A., "The Acceleration Damper", *Engineering*, 1934, p. 557. It consists of a solid mass constrained to oscillate unidirectionally in a container with a certain clearance. When attached to an oscillating primary system, the device employs plastic deformation, Coulomb friction and momentum transfer between masses during collision to reduce vibration of the primary system. It is essentially a highly nonlinear DVN in which the coupling element has deadspace characteristics.

Even with a relatively small auxiliary mass ratio, properly designed impact dampers are superior to DVN's in attenuating the response of structures subjected to non-stationary random excitations, such as earthquake ground motion. Small damping forces generated by the impacting mass of such a damper introduce chaos into the dynamic system response by disorganizing the orderly process of amplitude buildup. This reduces structural response drastically. However, prior art impact dampers are passive devices whose characteristics are optimized for a single set of operating conditions. As such, they cannot adequately handle wideband random excitation. This is particularly true in applications where both the root-mean-square (rms) level and the peak levels of the primary structure response are of concern, as is the case in most structural applications.

In an effort to overcome the inability of prior devices to adapt to changing conditions, applicants developed a method for active on-line control of vibration by applying corrective pulses of mechanical energy to a vibrating structure. The method, disclosed in U.S. Pat. No. 4,429,496, is highly effective in reducing the rms response as well as the peak response of vibrating structures, even when the excitation is nonstationary wideband random. However, it relies on the availability of substantial amounts of energy to produce control pulses on demand.

Therefore, it is desirable in many applications to provide an apparatus and method for suppressing movement of a primary system in response to a dynamic environment through expenditure of relatively small amounts of control energy.

SUMMARY OF THE INVENTION

The present invention is a method and apparatus for controlling stress in a flexible structure subjected to a dynamic environment, involving: a damper connectible to the flexible structure to suppress movement of the structure in response to the environment, the damper having at least one variable parameter affecting the extent of suppression provided; apparatus for sensing information relating to movement of the structure; and apparatus for controlling the operating parameter in accordance with the sensed information. The damper means is preferably an impact damper having an auxiliary mass mounted for movement within a variable clearance in response to oscillation of the structure to control translational or rotational movement of the structure. Control of the parameters of the damper may comprise controlling a variable clearance of the damper or controlling the timing of "impacts" between the auxiliary mass and the flexible structure. In this sense, the term "impact" includes any highly nonlinear impact-type coupling of the auxiliary mass with a flexible structure in such a manner that momentum is transfered therebetween. The coupling can take any of a variety of forms. It can be mechanical, electrical, or magnetic, as long as it is highly nonlinear and approximates a mechanical impact in a system having deadspace characteristics. In the preferred embodiment, impacts occur substantially when the flexible structure passes through a preselected control position within its range of movement, at which position the velocity of the structure is a maximum.

The method and apparatus of the present invention enable complex flexible structures to be controlled on-line by a relatively simple procedure in which parameters of a damper are varied in accordance with sensed movement. The system applies equally well to linear and nonlinear systems, whether excited by deterministic (i.e., predictable) or stochastic (i.e., random) environments. Movement of a complex nonlinear system, such as a skyscraper, in response to a stochastic input, such as earthquake ground motion, can be suppressed on-line by controlled damper parameters in accordance with motion sensed at the location of the damper. It is not necessary to consider the nonlinear nature of the vibrating system or the input applied to it, as long as parameters are controlled to provide damping substantially when the velocity of the system is a maximum.

Practical applications for the system of the present invention include a wide variety of other applications in which flexible structures experience destructive vibrational forces in response to dynamic environments. For example, the system has possible aerospace applications, such as suppressing "flutter" of aircraft wings and suppressing vibration of large space structures exposed to meteor showers and the like.

BRIEF DESCRIPTION OF THE DRAWINGS

The above and other features of the present invention may be more fully understood from the following detailed description, together with the accompanying drawings, wherein similar reference characters refer to similar elements throughout and in which:

FIG. 1 is a generalized schematic representation of a system constructed according to a preferred embodiment of the present invention, installed on a three-story building;

FIG. 2A is an analytical model of the building of FIG. 1, for use in calculating a generalized solution of the relevant motion equations;

FIG. 2B is a table of structural parameters attributable to the model of FIG. 2A for purposes of analysis;

FIG. 5 is an exploded isometric view, partially broken away, of a prototype impact damper constructed according to another preferred embodiment of the invention;

FIG. 5A is a fragmentary horizontal sectional view of the damper of FIG. 5, in the region of a single ratchet tooth thereof;

FIGS. 9A–9C depict a calculated time history of the response of the system of FIG. 3 under impulse excitation, both with and without use of the auxiliary mass damper of the present invention;

FIGS. 11A and 11B present actual data of the response of a specific mechanical model of a building under harmonic excitation, both without and with the controllable damper of the present invention, respectively;

FIGS. 13A and 13B present actual data of the response of the same mechanical model under stationary random excitation, both without and with the controlled damper of the present invention, respectively.

DESCRIPTION OF THE PREFERRED EMBODIMENTS

Figure 3:
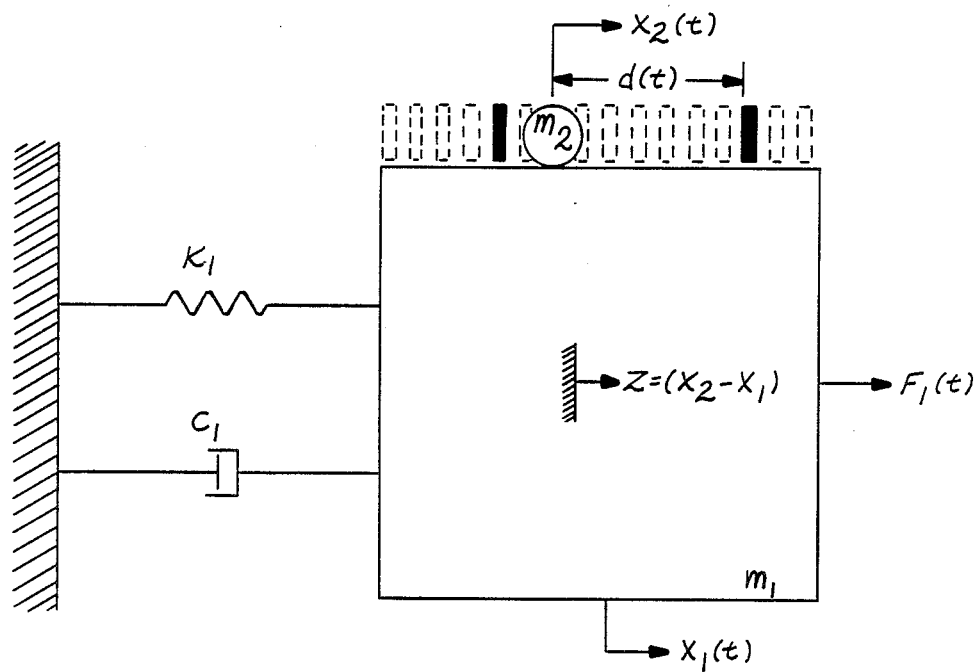
FIG. 3 is a schematic representation of an impact damper constructed according to a preferred embodiment of the present invention, in the context of a simplified system having a single primary mass.

FIG. 1 generally depicts the system of the present invention, as applied to a common multi-story building to suppress vibration in the presence of a dynamic environment, such as earthquake ground motion, gusts of wind, and the like. A building 10 is provided with a damping system 12 having a subsystem 14 which controls one or more parameters of a controllable damper 16 in response to information from a motion sensor 18. The damper 16 is mounted to and carried with the building 10 as it vibrates, permitting the damper to supply damping forces to the building. The motion sensor 18 is likewise mounted to the building and is preferably close to the damper 16 so that the sensed motion corresponds closely to the motion of the building at the damper.

The sensor 18 is calibrated to detect the endogenous state variables of the structure, which are used by the subsystem 14 to dynamically control operational parameters of the damper 16. The sensor may be one or more conventional devices suitable for detecting displacement, velocity or acceleration of the building in a predetermined direction. It is essentially a transducer designed to produce either an analog or a digital signal representative of a measured variable.

A control subsystem 14 may be either an analog or a digital controller having sufficient computing capability to perform the control calculations described below. As described in the succeeding discussion, the necessary calculations are straightforward and simple enough to be performed on an on-line basis to control the clearance, impact timing and/or other variable parameter of the damper 16. Various commercially available microcomputers, including the PDP 1134 manufactured by Digital Electronics Corporation of Maynard, Mass., possess sufficient computational power to make all calculations necessary for producing control signals within applicable time constraints.

Information required to implement the control system of FIG. 1 concerning motion of the building 10 and its strain energy, may be derived analytically from an appropriate mathematical model simulation of the structure. Various system characterization techniques exist for deriving a model appropriate for use in the practice of the present invention. FIG. 2A is a schematic representation of an idealized three-story building frame developed at the University of California at Berkeley. The chart of FIG. 2B contains significant numerical parameters of the model for purposes of computation. A generalized mathematical analysis of this multiple-degree-of-freedom system and the damper control parameters relating thereto is disclosed at pages 121 through 137 of Dehghanyar, T., "Analytical and Experimental Studies of the Active Control of Flexible Structures", a doctoral dissertation presented to the faculty of the graduate school of the University of Southern California (1984). The disclosure of that dissertation, which is catalogued and publicly available from the University of Southern California, is hereby incorporated by reference.

As discussed in the referenced dissertation, the parameter control system of the present invention is applicable to arbitrary distributed systems subjected to dynamic excitations, whether the excitations are applied directly or are supplied through base motion. However, for the sake of clarity in explaining the procedure and illustrating its applications, a single-degree-of-freedom (SDOF) system of the type shown in FIG. 3 is considered in detail herein. For completeness, the damper stops are modeled as illustrated in FIG. 4, wherein each has a quantifiable stiffness ($k_2$) and a viscous damping parameter ($c_2$).

Figure 4:
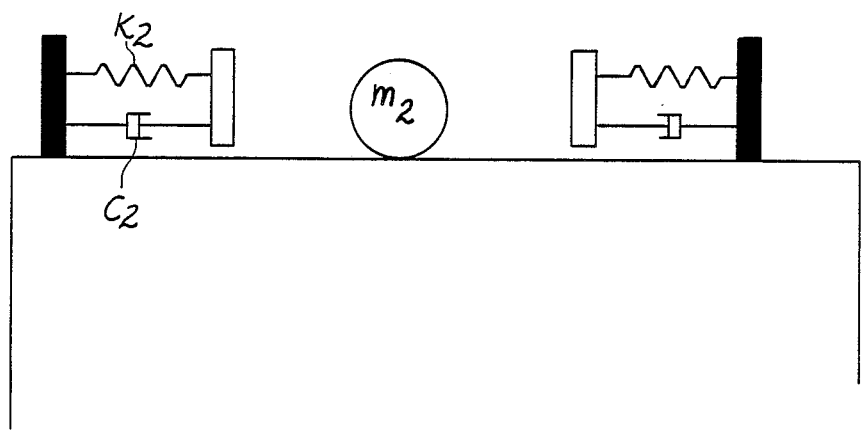
FIG. 4 is an enlarged schematic representation of an alternative embodiment of the impact damper of FIG. 3, in which the "stops" of the damper have a finite, controllable resilience.

The equations of motion for the system of FIGS. 3 and 4 are $$m_1\ddot{x}_1 + f_1(x_1,\dot{x}_1) - f_2(z,\dot{z}) = F_1(t), \quad (1)$$
$$m_2\ddot{x}_2 + f_2(z,\dot{z}) = 0,$$

where $f_1$ represents the resistance characteristics of the element connecting the primary system to ground;

$f_2$ represents the resistance characteristics of the element interposed between $m_1$ and the auxiliary mass $m_2$;

$F_1(t)$ represents the dynamic load acting on $m_1$;

$x_i(t)$ is the absolute displacement of mass i; i=1,2;

$z(t)$ is the relative displacement between $m_1$ and $m_2$; $z = x_2 - x_1$.

In the case of a linear single-degree-of-freedom system provided with an impact damper having stiff, resilient stops, the equations of motion become $$\ddot{x}_1 + 2\zeta_1\omega_1\dot{x}_1 + \omega^2 x_1 - \mu q(z,\dot{z},\underline{p}) = F(t), \quad (2)$$
$$\ddot{x}_2 + q(z,\dot{z},\underline{p}) = 0$$

where:

$f_1(x_1,\dot{x}_1) = c_1\dot{x}_1 + k_1 x_1$;

$c_1$ = viscous damping coefficient associated with $f_1$;

$k_1$ = linear spring constant associated with $f_1$;

$\omega_1 = (k_1/m_1)^{\frac{1}{2}}$;

$\zeta_1 = 0.5 c_1 (k_1 m_1)^{-\frac{1}{2}}$;

$F(t) = F_1(t)/m_1$;

$\mu = m_2/m_1$;

$q(z,\dot{z},p) = 2\zeta_2\omega_2 h(z,\dot{z},d) + \omega^2 g(z,d)$;

$\omega_2 = (k_2/m_2)^{\frac{1}{2}}$;

$\zeta_2 = 0.5 c_2 (k_2 m_2)^{-\frac{1}{2}}$ $g(z,d) = [z - \text{sgn}(z)d] u(|z| - d)$;

$h(z,\dot{z},d) = \dot{z}\, u(|z| - d)$;

d = impact damper clearance; equal to half of total gap size in the passive damper;

sgn(.) = the algebraic sign of its argument;

u(a) = unit step function defined by $$u(a) = 1; \text{ if } a > 0$$
$$u(a) = 0; \text{ if } a < \text{ or } = 0;$$

$k_2$ = stiffness of the resilient damper stops; and $c_2$ = equivalent viscous damping parameter involved during impacts.

It is clear from Equation (2) that the term $q(z,\dot{z},\underline{p})$, which depends on the relative displacement z and the velocity $\dot{z}$ between the two oscillating masses, and on the damper parameters that constitute the components of vector p, represents the cumulative effects of the normalized control force exerted by the auxiliary mass $m_2$ on $m_1$. The influence of this damping force on $m_1$ is directly proportional to the mass ratio $\mu = m_2/m_1$.

If the system of FIG. 3 is provided with a frictionless passive impact damper having infinitely stiff stops with a coefficient of restitution e, its steady-state motion with two symmetric impacts per cycle of the harmonic excitation $F_0 \sin\Omega t$ is exactly described by the following simple expression:

$$x_1(t) = \exp(-\zeta_1\omega_1)(B_1 \sin\omega_1\eta_1 t + B_2 \cos\omega_1\eta_1 t) + \quad (3)$$
$$A \sin(\Omega t + \tau); 0 < \Omega t < \pi$$

where:

$\eta_1 = (1 - \zeta_1^2)^{\frac{1}{2}}$;

r = dimensionless excitation frequency ratio, $\Omega/\omega$;

$A = (F_0/k_1) H(r,\zeta_1)$;

$|H(r,\zeta)|$ = dimensionless transfer function;

$|H| = [(1-r^2)^2 + (2\zeta r)^2]^{-\frac{1}{2}}$;

and $B_1$, $B_2$ and $\tau$ are functions of the impact damper parameter $\mu$, e, and d.

An important feature of the exact solution in Equation (3) is that, for a passive impact damper of a particular size $\mu$ using a material with a particular e for its stops, the peak value of $x_1(t)$ under steady-state excitation can be optimized (minimized) by a proper choice of the damper clearance d.

The basic idea behind the present control strategy is to provide the primary vibrating structure with the most beneficial damping effects resulting from collisions between the auxiliary and primary masses. This objective is achieved by actively adjusting the position of the resilient motion limiting stops, so that the generated impacts occur in optimum phase with respect to the response.

Mathematically, the problem can be formulated by considering a typical cost (i.e., amount of stress) function J in the form of $$J(d) = \alpha_1 x_{1max} + \alpha_2 \int_{t_l}^{(t_l + T_{opt})} x_1^2(t) dt, \quad (4)$$

where $x_{1max}$ is the peak displacement of the primary structure during the time $t_1 < t < (t_l + T_{opt})$;

$t_l$ is the time the last impact was completed;

$t_{opt}$ is a time interval related to the time constant of the system; and $\alpha_1, \alpha_2$ are weighting constants.

The control approach can now be stated in terms of an optimization process, involving Equation (4) as the cost function and the clearance distance d as the critical parameter. In principle, standard optimization techniques can be used at this stage to determine the optimum value of the gap size $d_{opt}$. However, due to the severe nonlinearity associated with the vibroimpact nature of the system, standard analytical solution methods are not applicable for the development of accurate closed form solutions that predict the behavior of a nonlinear multiple-degree-of-freedom system under transient excitation. Alternative numerical approaches are also computationally involved and unsuitable for on-line implementation in situations involving nondeterministic excitations, in which the optimization process has to be repeated numerous times.

On the other hand, it is possible to obtain qualitative insights into the physics of the optimum impacts by studying the damper's off-line behavior. This examination leads to useful observations which assist in the practical utilization of the damping device. To pursue this task, a direct search method of optimization is employed. The goal is to explore the possibility of establishing a simple relationship between the cost function, J(d), and an appropriate measure of the physical characteristics of the damping mechanism. The technique simply tests a set of prescribed values for d(t) and determines that set which minimizes the cost function. The process is repeated for time segments of length $T_{opt}$, each starting from the time the last optimum impact was ended.

Before examining the qualitative behavior of Equation (4), it is worth noting that the first term on the right-hand-side of Equation (4) measures the contribution of the peak response, while the second component represents the contribution of the rms level of the transient response during the optimization interval. Depending on the relative magnitude of $\alpha_1$ and $\alpha_2$, varying amounts of emphasis can be placed on minimization of the peaks or the rms level.

To illustrate this approach, consider a linear single-degree-of-freedom system with inherent damping $\zeta_1=0.05$ that is provided with an impact damper having a mass ratio $\mu=0.1$ and rigid stops with a coefficient of restitution $e=0.75$. If the primary system $m_1$ is now subjected to a transient load consisting of swept-sine excitation of the form $F_1(t)=F_0\sin[\Omega(t)t]$, where $\Omega(t)=at+b$, the auxiliary mass $m_2$ will sustain repetitive (generally chaotic) impacts on different sides of its container. The number, location and intensity of these irregular impacts is a highly nonlinear function of the system characteristics and the nature of the excitation. If the time of occurrence of one of these impacts is used to define the reference time t appearing in Equation (4), then the variation of the peak and rms levels of $x_1(t)$ with the gap size d that governs the time of occurrence of the succeeding impact can be calculated.

Since the predominant mechanism that governs interaction between $m_1$ and $m_2$ is momentum transfer, it is reasonable to expect a strong dependence of the criterion function $J(d)$ on the discontinuity in the velocity of $\dot{x}_1$ and/or $\dot{x}_2$ during the impact process. This expectation is borne out by calculation. It is thus clear that, for the situation under consideration, optimizing $J(d)$ is practically identical to seeking an extremum value of the momentum transfer involved in the impact process. For the class of problems under discussion, this condition is equivalent to having an impact occur when the primary system's velocity is at its peak value.

The preceeding discussion establishes the guidelines for a simple procedure to optimize the operation of controllable impact dampers configured as mentioned above. To maximize the efficiency of an impact damper between two consecutive impacts, the gap size d is adjusted so that the following conditions are satisfied:

1. An impact is made to occur when the velocity of the primary system has reached its peak value. This instant corresponds to the "zero crossing" of system displacement.

2. The velocities of the two colliding masses must be opposite to each other at time of impact. This condition insures that the impact process will stabilize the motion of the primary system.

These guidelines give rise to two slightly different control algorithms for on-line implementation of the controllable damping device of the present invention. The algorithms employ the same basic principle, selection of one method over the other depending mainly on the hardware design of the impact damper and the physical characteristics of the vibrating system.

ADAPTIVE CONTROL STRATEGY

A first control strategy consists of detecting the displacement (absolute or relative to a moving support) zero crossing of the oscillating structure and generating an impulsive control force by inducing a collision between the auxiliary mass and the structure. The essential features of this approach can be summarized as follows:

1. No global information regarding dynamic system characteristics is needed.

2. Only system displacement need be monitored.

3. On-line computation of the clearance distance d is reduced to a simple detection process.

Figure 6A:
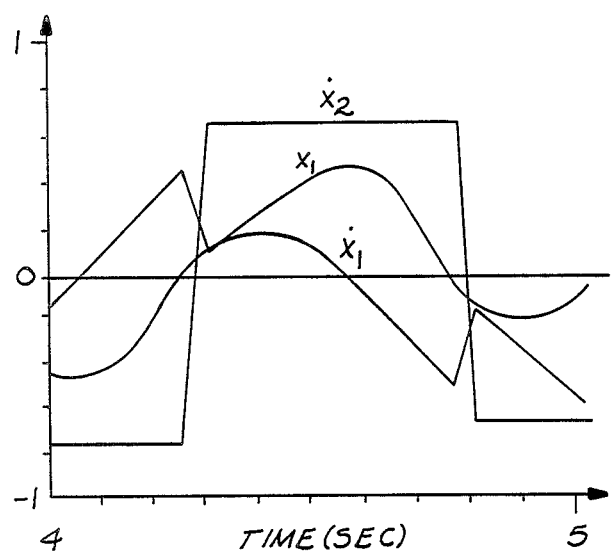
FIGS. 6A–6D are graphs of the calculated steady state response of the system of FIG. 3 when the impact damper is controlled according to an adaptive control strategy.
Figure 6B:
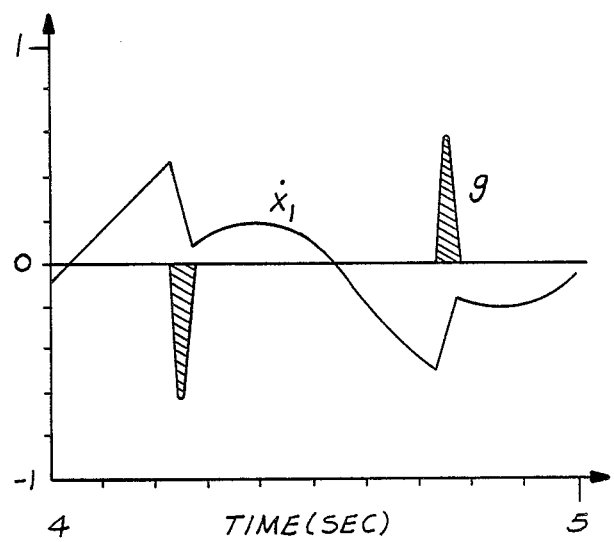
Figure 6C:
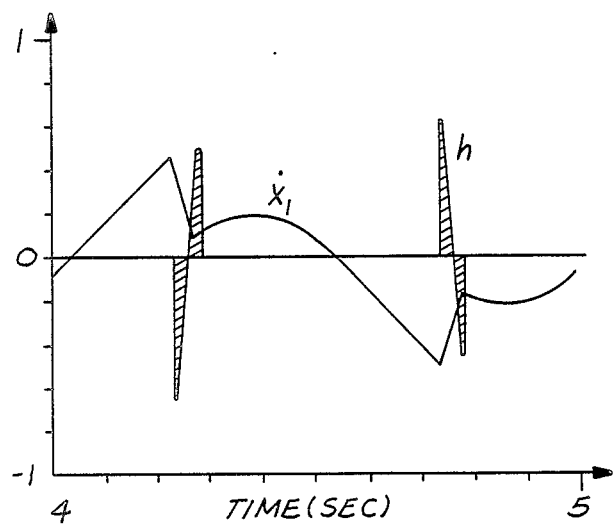
Figure 6D:
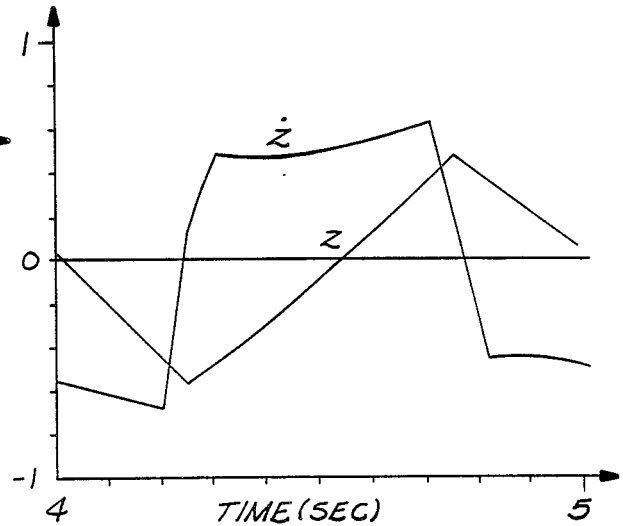

To illustrate the application of this approach, a representative segment of the motion being controlled by such a damper is shown in the figures. The graphs of FIGS. 6A–6D represent the absolute and relative state variables of the system and the nonlinear conservative and nonconservative control functions g and h. The primary system has a ratio of critical damping $\zeta_1=0.05$ and is excited at resonance. The impact damper mass ratio $\mu=0.1$ and its adjustable-gap stops have a coefficient of restitution $e=0.75$. The time segment shown covers approximately one natural period $T_1$ of the primary system and the time histories have been normalized to lie between $-1.0$ and $+1.0$. FIG. 6A depicts the absolute displacement $x_1$ of the primary system, and the absolute velocities of the primary and auxiliary systems, $\dot{x}_1$ and $\dot{x}_2$, respectively. Since the auxiliary mass moves frictionlessly between collisions, its absolute velocity remains constant during that time. FIG. 6B depicts the absolute velocity of $m_1$ and the nonlinear conservative function $g(.)$, representing the stiffness of the stops, and shows that the contact phase of the motion is very short in comparison to the primary system period. The nearly discontinuous change in system velocity reflects the momentum transferred during the impact process. FIG. 6C depicts the absolute velocity of $m_1$ and the nonlinear nonconservative function $h(.)$ associated with the plastic deformation involved in the inelastic impact between the two masses. FIG. 6D depicts the relative displacement and velocity of the auxiliary mass $m_2$ with respect to $m_1$. The magnitude of the coefficient of restitution can be directly determined from the ratio of the relative velocity z before and after an impact. As shown in FIGS. 6A–6D, suitable control impacts are applied twice each fundamental period of the system. The total control energy exerted on the structure during impact is the sum of the areas under the g and h functions.

The only significant disadvantage of the adaptive control technique is the lack of consideration for possible hardware delays in activation of the impacting mechanism. Two possible provisions may be adopted to overcome this inadequacy:

1. Activate the impacting mechanism very rapidly so that the delays are small when compared to the fundamental period of the structural system; or 2. Activate the impacting mechanism when the displacement of the structure crosses a preselected threshold level.

In the event that these remedies cannot be accommodated, the following modified version of the control algorithm can be used.

PREDICTIVE CONTROL STRATEGY

A second control strategy is based on the assumption that, when dealing with nonstationary dynamic loads, the excitation can be treated as a zero mean random process between two consecutive impacts. During this time the expected value of $x_1(t)$ will not depend on $F_1(t)$ (or the base motion $s(t)$) and can be written as:

$$E[x_1(t)] = u(t-t_l)\dot{x}_1(t_l) + v(t-t_l)x_1(t_l), \qquad (5)$$

where $$u(t) = \exp(-\zeta_1\omega_1 t)[(\zeta_1/\eta_1)\sin\omega_1\eta_1 t + \cos\omega_1\eta_1 t]$$
$$v(t) = \exp(-\zeta_1\omega_1 t)[(\omega_1\eta_1)^{-1}\sin\omega_1\eta_1 t]$$

and l denotes the state of the system at completion of the last impact. Hence the task of the control process of subsystem 14 (FIG. 1) is to use the results of Equation 5 to predict the time of the next displacement zero crossing and to synchronize the hardware activation time so that an impact occurs at the anticipated time.

Figure 7A:
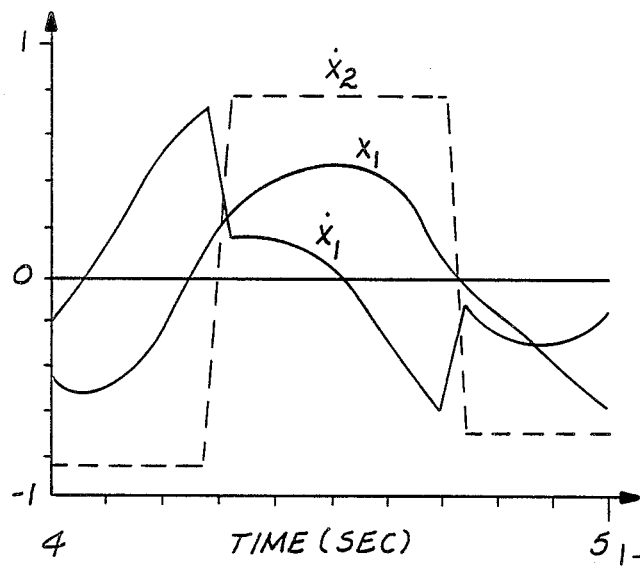
FIGS. 7A–7D are graphs of the calculated steady state response of the system of FIG. 3 when the system is harmonically excited and the damper is controlled according to a predictive control strategy.
Figure 7B:
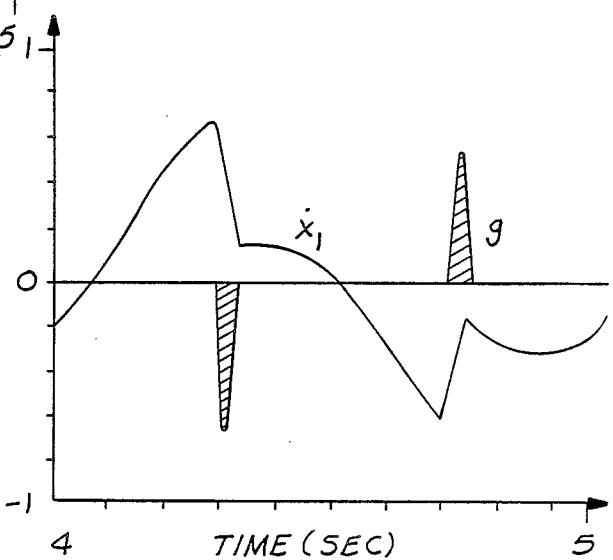
Figure 7C:
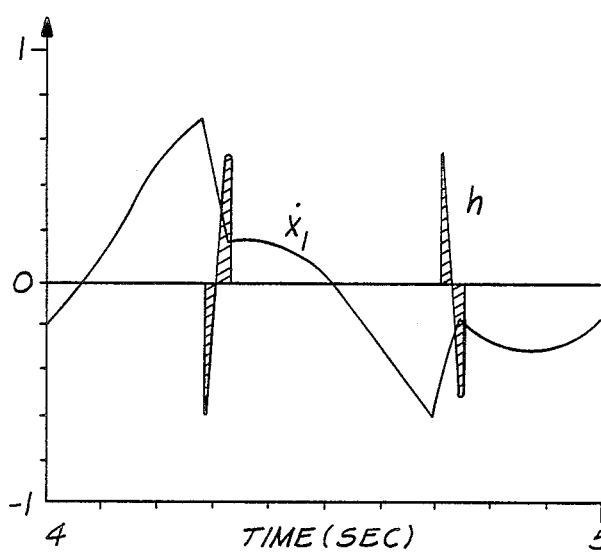
Figure 7D:
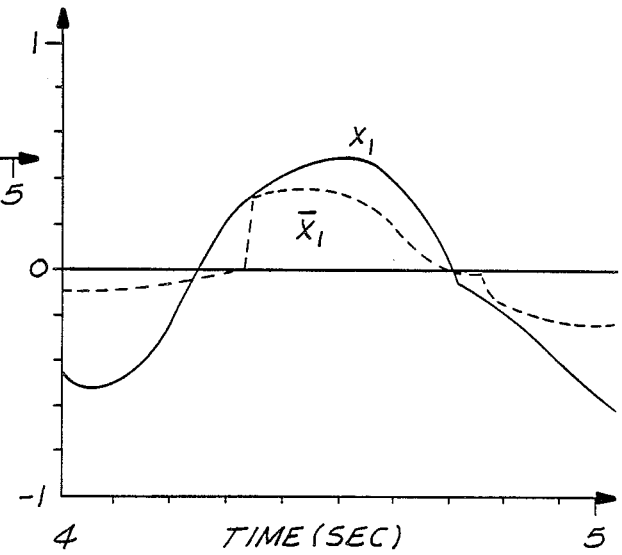

From an on-line computation standpoint, this predictive approach is more involved than the adaptive approach; however, it does provide the hardware mechanism with a lead time (approximately half of the fundamental period) for proper adjustment. FIGS. 7A–7D illustrate the various state variables of the system for a typical time segment, wherein FIG. 7D represents a comparison between the predicted and the actual displacement of the structure. It is worth noting that, unlike the adaptive control strategy, the predictive control strategy requires a prior knowledge of the physical characteristics of the system to be controlled.

The efficiency of the proposed control strategies is demonstrated by the following numerical simulation results, wherein the single-degree-of-freedom model of FIGS. 3 and 4 is subjected to various deterministic and stochastic dynamic environments.

Simulation No. 1 - Harmonic Excitation.

Figure 8:
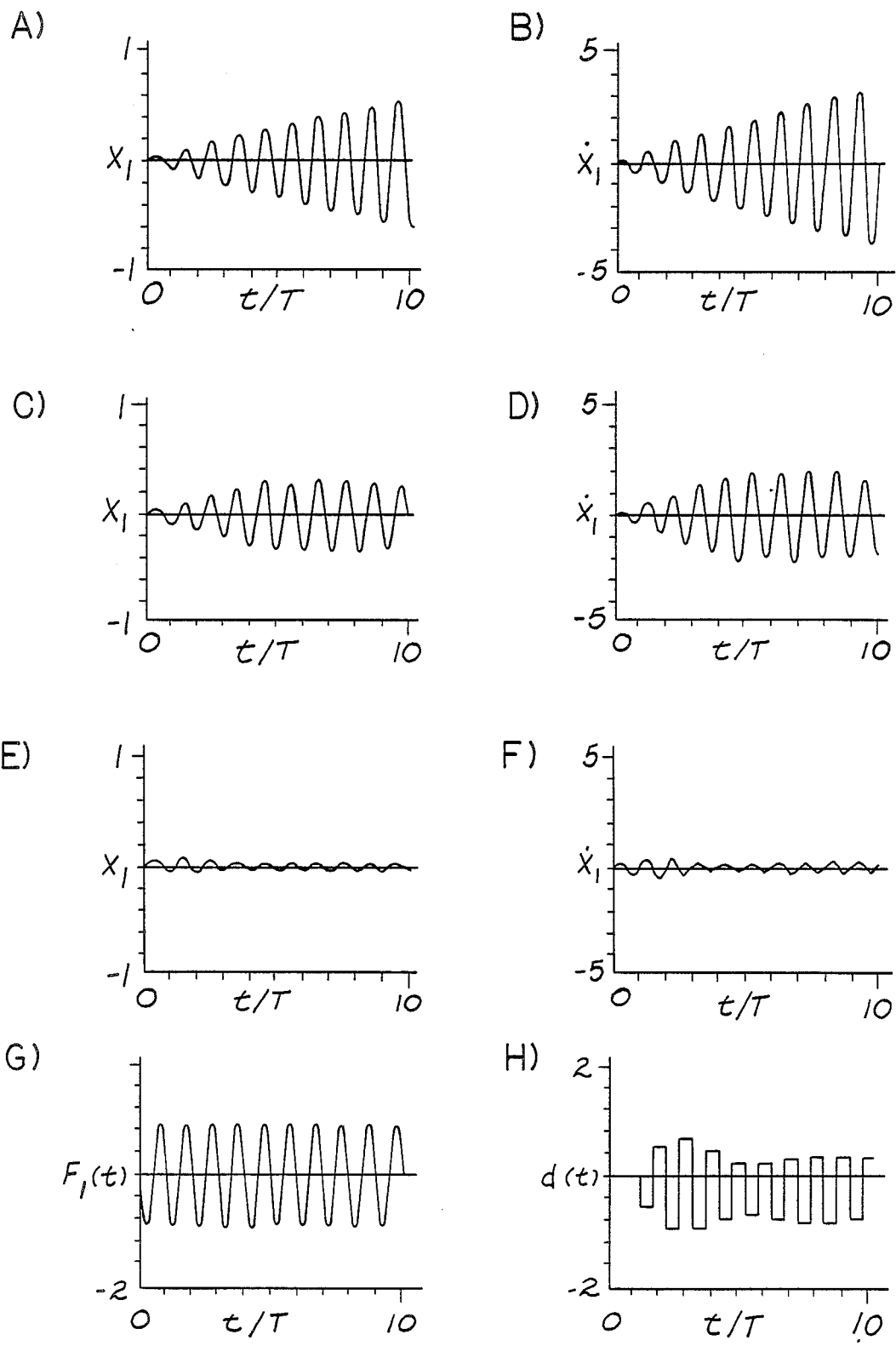
FIGS. 8A–8H represent a calculated time history of the response of the system of FIG. 3 under harmonic excitation at resonance.

The results shown in FIGS. 8A–8H correspond to a linear viscously damped single-degree-of-freedom primary system of mass $m_1$ which is initially at rest, has a natural frequency $\omega_1 = 2\pi$, and has a ratio of critical damping $\zeta_1 = 0.01$. The system is subjected to harmonic excitation (FIG. 8G) of magnitude $F_0 = 1$ and a constant frequency $\Omega$ which equals the undamped natural frequency $\omega_1$ of $m_1$ (thus $r = \Omega/\omega_1 = 1$). The transient displacement $\dot{x}_1(t)$ and velocity $x_1(t)$ of the system, in the absence of an auxiliary mass damper, are shown in FIGS. 8A and 8B, respectively, over a span of ten (10) fundamental periods (i.e., $t/T_1 = 10$). Had the forced response been allowed to reach its steady state (at $t/T_1 \simeq 25$), the peak displacement $x_{1max}$ would have become equal to $50(F_0/k_1)$.

FIGS. 8C and 8D illustrate the same single-degree-of-freedom system provided with an optimized passive impact damper having a mass $m_2 = 0.1\ m_1$, stiff stops characterized by $\omega_2/\omega_1 = 10$, and energy dissipation equivalent to $\zeta_2 = =0.1$ (corresponding to a coefficient of restitution $e = 0.75$). The gap size is set equal to a value $d_{opt}$ which is chosen to yield a minimum peak displacement response during the test period $0 < t < T_{max}$. Due to the nonlinear nature of the impact-dampened system, numerical techniques have to be used to determine $d_{opt}$ for this transient phase of the motion. If the value of d is kept equal to $d_{opt}$ but the excitation time $T_{max}$ increases from $10\ T_1$ to $25\ T_1$, the peak response of $m_1$ increases substantially. This fact illustrates a typical limitation of the passive impact damper. While it can be designed to be very effective over a relatively narrow excitation frequency range, its operation over a relatively wide frequency and/or amplitude range, compared to the conditions under which its gap was optimized, may result in unacceptable performance characteristics (possibly even amplifying rather than attenuating the motion of $m_1$). In other words, if the value of d had been set equal to the optimum d when the system is undergoing steady-state motion (i.e., $t/T_1 >> 1$), the response of $m_1$ during the transient phase of the motion covering the time span $0 < t/T_1 < 10$ would have been much larger than the level shown in FIGS. 8C and 8D. The value of d used here is 1.23 while the optimum value under steady state conditions is 4.56.

If the single-degree-of-freedom system is now provided with a controlled impact damper having a gap size repetitively adjusted according to the adaptive control strategy discussed above, the resulting response of the primary system during the test period is as shown in FIGS. 8E and 8F. Unlike what happens with the passive impact damper, the level of attenuation evident in this case during the transient test period shown is indefinitely sustained. The corresponding values of d(t), representing the evolution of the damper stops during the test period, are shown in FIG. 8H. As might be expected, the limits of d(t) gradually approach a steady-state value. It is worth noting that when the system reaches steady-state conditions at $t/T >> 1$, the value of d(t), as determined by the control algorithm under discussion, becomes identical to the value of $d_{opt}$ based on minimizing the exact analytical solution (Equation 3) corresponding to steady-state motion of the impact-dampened system.

Simulation No. 2 - Impulsive Excitation.

If the primary system described in the previous example is now subjected to an impulsive excitation, its free vibrations over a period of $\simeq 40$ natural periods are as shown in FIG. 9A. When provided with a controllable impact damper having the same characteristics as those of the preceding example, the calculated motion is as shown in FIG. 9B and the evolution of the gap size is as illustrated in FIG. 9C.

It is worth noting that the peak response occurs during the first excursion of the motion, before the impact damper, which is assumed to be initially at rest in the middle of its container, can be mobilized to exchange momentum with the primary system. Note also that after about 5 natural periods, the damper ceases operation (no more impacts occur) since the primary system's response falls below a prescribed threshold below which the damping mechanism is deactivated.

Simulation No. 3 - Random Excitation.

Figure 10:
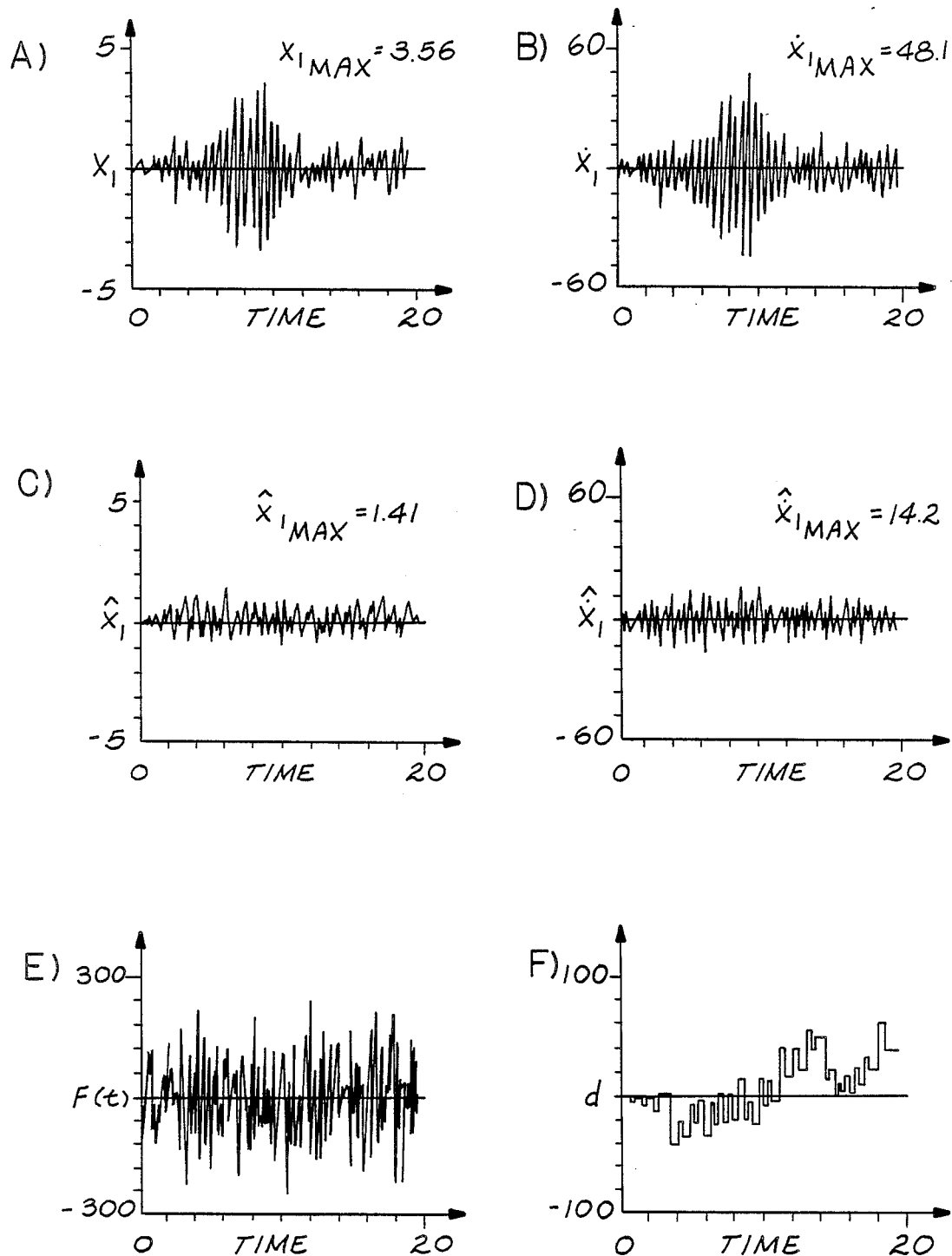
FIGS. 10A–10F depict the calculated response of the system of FIG. 3 under random excitation, both with and without the auxiliary mass damper of the present invention.

The previous two cases involved disturbances and/or responses characterized by smoothly changing oscillations. By contrast, the present example deals with a zero-mean wide-band Gaussian random excitation of which a representative time history segment is shown in FIG. 10E. The portion of the displacement and velocity response history shown in FIGS. 10A and 10B span a time segment of 40 natural periods $T_1$. Due to the slight amount of inherent damping ($\zeta_1 = 0.01$) in the primary system, the response of $m_1$ exhibits the characteristics of a narrow-band process.

When the primary system is provided with the controllable impact damper used in the previous examples, the resulting controlled motion becomes as shown in FIGS. 10C and 10D. The level of attenuation in the peak displacement is $(\hat{x}_1/x_1) = 1.41/3.65 \simeq 0.39$, and the corresponding reduction in the peak velocity is $(\dot{\hat{x}}_1/\dot{x}_1) = 14.2/48.1 \simeq 0.29$. Even better results are obtained for the rms reduction level.

The time history of the adaptive gap size is shown in FIG. 10F. The lack of any discernible pattern in the evolution of the optimum gap size reflects the nature of the random disturbance. The complex changes of d(t) between impacts clearly illustrate the handicaps passive dampers have to cope with since their initial (fixed) gap size cannot change with time to accommodate quiescent or active episodes of the random response.

Thus, a simple yet efficient method is presented for the on-line parameter control of linear as well as nonliner systems provided with adjustable-gap impact dampers responding to arbitrary dynamic loads. The on-line control algorighm described herein is suitable for situations in which detailed knowledge of the system structure is not available. Only local measurements in the vicinity of each of the attached impact dampers are needed with the adaptive control method to determine the evolution of each impact damper clearance so as to optimize the vibration attenuation efficiency of the individual dampers.

In order to accommodate time delays associated with available actuator hardware, a second on-line control method is presented in which partial knowledge of the primary system's properties is used to anticipate or "predict" evolution of the dynamic system trajectory, thereby allowing for incorporation of a certain lead time into the control process in order to compensate for hardware limitations.

A stability analysis, simulation studies, and experimental tests with a mechanical model have demonstrated the feasibility, reliability, and robustness of the proposed on-line control method. The experimental tests were performed on a model made up of a simple, one-story rigid frame having a rectangular plate (10 inches by 12 inches) and four specially designed columns (15 inches long). The columns provide a natural frequency of approximately 1.3 hertz and a damping ratio of approximately 2 percent. The entire structure is made of aluminum and weighs 20 pounds.

In the experimental model excitation is provided to the system by an electromagnetic shaker capable of generating low frequency motion. Base excitation is used as a matter of convenience, with the knowledge that the qualitative response of a single-degree-of-freedom oscillator does not depend on where the excitation is applied.

Electro-optical displacement followers (Optron I and II) were employed to measure absolute displacement of the structure and the base. Relative motion was obtained through an analog summing unit and relative velocity was computed by direct differentiation of the relative displacement signal using a high accuracy analog differentiator. Acceleration was measured by a piezoresistive accelerometer.

A controllable damper of the experimental model, designated 20 in FIG. 5, has an auxiliary mass 22 mounted for linear movement in a direction 24 relative to a pair of opposed side plates 26. The side plates are held in a parallel spaced relationship by braces 28, and the auxiliary mass is mounted for movement by pairs of rollers 30 extending from opposite sides of the mass to engage longitudinal slots 32 of the plates.

Movement of the auxiliary mass 22 is controlled by a series of ratchet teeth 33 carried by upper and lower pairs of platens 34 and 36, respectively of the side plates 26. Each pair of platens is actuable inwardly toward the auxiliary mass 22 from an initial retracted condition, illustrated by the position of the lower platens 36 in FIG. 5, to an engaged condition, illustrated by the position of the upper platens 34 in FIG. 5. The teeth of the upper platens are directed oppositely to the teeth of the lower platens, permitting the two sets of teeth to engage the auxiliary mass 22 in opposite directions. In the configuration of FIG. 5, the teeth of the upper platens 34 prevent movement of the auxiliary mass 22 from left to right when the upper platens are in the engaged condition and the teeth of the lower platens 36 prevent movement in the opposite direction when the lower platens are in the engaged condition. The platens are moved in and out between the retracted and engaged conditions thereof by a plurality of solenoid actuators 38 mounted to the opposed side plates 26 by pedestals made up of cross plates 40 and corresponding mounting legs 42. Each actuator 38 has an actuating shaft 44 which acts on an end of one of the platens through an actuator block 46 carried by the platen.

The teeth 33 are individually mounted to the platens for rotation about vertical pins 48 between an extended condition, illustrated in full lines in FIG. 5A, and a retracted condition, illustrated in broken lines. Each tooth is biased toward the extended condition to engage projections 50 of the auxiliary mass 22 when the platen containing it is moved to the actuated condition, preventing movement of the mass in a prescribed direction but yielding to movement of the mass in the opposite direction. When a pair of platens is actuated to stop the auxiliary mass 22, the projection 50 impacts a small face 52 of a tooth of each platen to transfer momentum from the mass to the system to which the damper is attached. The auxiliary mass 22 then begins moving in the opposite direction in preparation for another impact. Before the platens can be retracted, the projections 50 may bear against the larger, inclined faces 54 of one or more of the teeth 33, camming them outwardly to the retracted condition of FIG. 5A. This presents very little resistance to the auxiliary mass, leaving it free to move in the opposite direction from the moment of impact.

In operation, the pairs of platens 34 and 36 are alternately actuated inwardly by the solenoids 38 according to input from the motion sensor 18 (FIG. 1) to control the effective clearance of the damper 20 as the auxiliary mass oscillates. Thus, the location and timing of the damper stops are progressively set and reset, as required to maximize the damping effect according to one of the algorithms discussed above. This causes the stops and the effective damper clearance to evolve in the manner shown in FIGS. 8H, 9C, or 10F, depending on the nature of the input.

As discussed above, the control subsystem 14 may be any suitable controller able to determine an actual or anticipated maximum in the velocity of the primary system and to actuate the solenoids of the damper 20 to produce an impact. Such an impact transfers momentum between the auxiliary mass, $m_2$, and the primary mass, $m_1$, effectively damping the build-up of stress within the system. The damper 20 of FIG. 5 permits this to be done without sensors to monitor the state of the auxiliary mass, simplifying the control to an "on/off" type algorithm and eliminating the need to compute and supply a value for gap size. The resulting savings of computation time in the decision making process are enormous. Upon detection of a zero-crossing of system displacement, an "impact" command is issued. This switches a relay circuit, activating the solenoids 38 to set the impact barriers. The solenoids are capable of moving either pair of platens into impact position in four milliseconds, which is 1/20 of the fundamental period of the structure.

Figure 12:
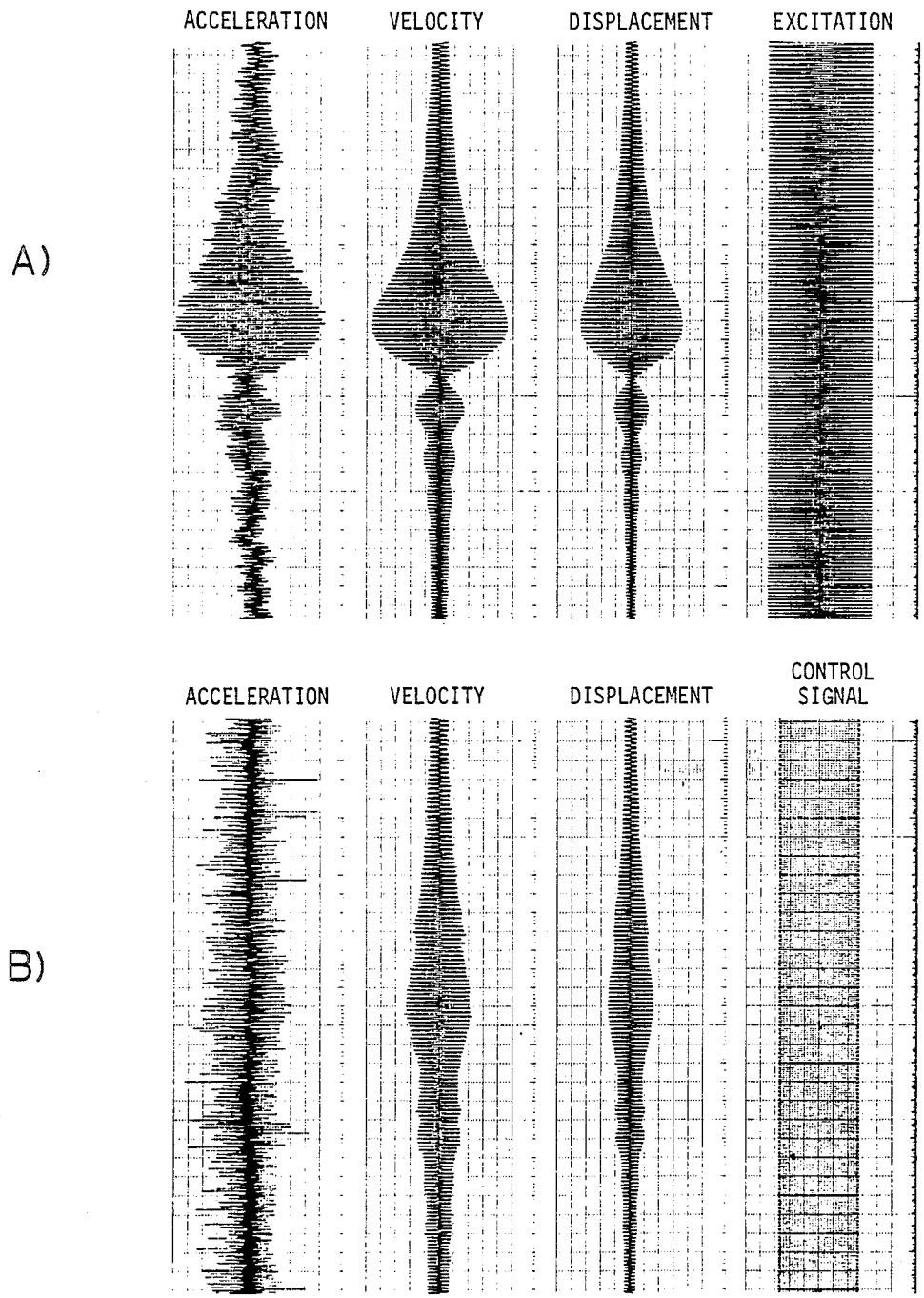
FIGS. 12A and 12B present actual data of the response of the same mechanical model under sweptsine excitation, both without and with the controllable damper of the present invention, respectively.

Response of the model has been measured for three types of base excitation, both with and without operation of the controllable damper of FIG. 5. FIGS. 11A, 12A and 13A represent the response of the undampened system for harmomic, swept-sine and stationary random excitation, respectively, and FIGS. 11B, 12B and 13B represent the response when the controllable damper of FIG. 5 is used. A mass ratio of approximately 10 percent was used in these measurements. From the results, it is observed that the peak displacement is reduced 75 percent under sinusoidal loading and 53 percent under swept-sine excitation. In the case of stationary random excitation, the rms displacement drops to one tenth of the uncontrolled response as the peak displacement is reduced by 50 percent.

Although the experimental results achieved herein illustrate the profound advantages of the disclosed system, the results can be improved significantly by refining the damper structure. Such refinement can take the form of increasing the number of ratchet teeth to increase the accuracy of impact timing. Other refinements, such as the use of electrical or electromagnetic coupling between the auxiliary and primary masses, are useful in certain circumstances. For example, a controllable electromagnetic damper would be particularly suitable for suppressing torsional movement.

From the above, it can be seen that there has been provided an apparatus and method for efficiently suppressing linear or nonlinear vibrations by controlling one or more operating parameters of a highly nonlinear impact-type damping device. The damping function can be controlled on the basis of local measurement of response variables, without considering global variables.

The appended claims are not limited to the embodiments described herein, but rather are intended to cover all variations and adaptations falling within the scope and spirit of the present invention.

What is claimed is:

1. Apparatus for controlling stress due to oscillation of a flexible structure subjected to a dynamic environment having stochastic, wide band amplitude and time characteristics, comprising:
impact-type damper means having a main portion connectible to the flexible structure for force transmission therebetween;
the impact-type damper means having:
an auxiliary mass mounted for relative movement in response to oscillation of the flexible structure; and
means for causing impacts between the auxiliary mass and the main portion of the damper means to apply nonlinear impact forces to the flexible structure;
the means for causing impacts having deadspace characteristics and at least one variable operating parameter affecting the application of said impact forces;
means for sensing information relating to movement of the structure; and
means for controlling said operating parameter in accordance with sensed information so that said impact forces oppose movement of the structure and prevent buildup of uncontrolled oscillation.

2. The apparatus of claim 1 wherein:
the auxiliary mass is mounted for movement within a variable clearance in response to oscillation of the structure; and
the controlling means includes means for controlling said variable clearance.

3. The apparatus of claim 1 wherein the movement of the auxiliary mass is primarily translational movement.

4. The apparatus of claim 1 wherein:
the damper means is constructed and arranged to produce a series of impacts between the auxiliary mass and the flexible structure; and
the controlling means controls the timing of impacts in accordance with the sensed information.

5. The apparatus of claim 4 wherein:
the flexible structure oscillates about a preselected neutral position; and
the controlling means causes impacts to occur substantially when the flexible structure passes through said neutral position.

6. The apparatus of claim 1 wherein:
the motion limiting means comprises at least one pair of oppositely directed engagement means, each of said engagement means being actuable between a first retracted condition in which the auxiliary mass is free to move in two opposite directions relative to the flexible structure and a second engaged position in which relative movement of the auxiliary mass is impeded in one of said directions; and
the controlling means includes means for alternately actuating the oppositely directed engagement means in accordance with the sensed information.

7. A building comprising, in combination:
a flexible main frame; and
the apparatus of claim 1 connected to the main frame.

8. Apparatus for controlling stress to a flexible structure which oscillates when subjected to a dynamic environment having stochastic, wide band amplitude and time characteristics, comprising:
impact-type damper means having:
a main portion connectible to the flexible structure for force transmission therebetween; and
an auxiliary mass mounted for relative movement in response to oscillation of the structure, movement of the auxiliary mass being opposite to the direction of oscillation during at least a portion of each cycle of oscillation; and
means for causing impacts between the auxiliary mass and the main portion to apply nonlinear impact forces to the flexible structure;
the means for causing impacts having deadspace characteristics and at least one variable operating parameter affecting the application of said impact forces;
means for sensing information relating to oscillation of the flexible structure; and
means for controlling said operating parameter in accordance with the sensed information so that an impact occurs during said portion of each cycle of oscillation.

9. The apparatus of claim 8 wherein:
the sensing means includes means for detecting the amplitude of oscillation of the flexible structure; and
the coupling means is constructed and arranged to cause coupling to occur only when said amplitude exceeds a preselected threshold value.

10. The apparatus of claim 8 wherein the coupling means comprises:
means for determining from sensed information an optimal time to couple the auxiliary mass to the flexible structure; and
means for coupling the auxiliary mass to the flexible structure at said optimal time.

11. The apparatus of claim 10 wherein:
the flexible structure oscillates about a preselected neutral position; and the coupling means comprises means for coupling the auxiliary mass to the flexible structure when the flexible structure passes through said neutral position.

12. The apparatus of claim 8 wherein the coupling means comprises means for limiting motion of the auxiliary mass relative to the flexible structure.

13. Apparatus for controlling stress to a flexible structure subjected to a dynamic environment, comprising:

damper means connectible to the flexible structure to suppress movement of the structure in response to said environment;

said damper means having an auxiliary mass mounted for relative movement in response to oscillation of the flexible structure and means for limiting motion of the auxiliary mass relative to the structure to suppress movement of the structure;

the motion limiting means having at least one variable operating parameter affecting the extent of suppression provided;

means for sensing information relating to movement of the structure; and means for controlling said operating parameter in accordance with sensed information, the motion limiting means comprising at least one pair of oppositely directed ratchet means, each of said ratchet means being actuable between a first retracted condition in which the auxiliary mass is free to move in two opposite directions relative to the flexible structure and a second engaged position in which relative movement of the auxiliary mass is impeded in one of said directions; and the controlling means includes means for alternately actuating the oppositely directed ratchet means in accordance with the sensed information.

* * * * *